United States Patent
Shinohara et al.

(10) Patent No.: US 9,950,369 B2
(45) Date of Patent: Apr. 24, 2018

(54) MANUFACTURING METHOD OF SINTERED ALLOY, COMPACT FOR SINTERING, AND SINTERED ALLOY

(71) Applicants: TOYOTA JIDOSHA KABUSHIKI KAISHA, Toyota-shi, Aichi-ken (JP); FINE SINTER CO., LTD, Kasugai-shi, Aichi (JP); Sanyo Special Steel Co., Ltd., Himeji-shi, Hyogo (JP)

(72) Inventors: Nobuyuki Shinohara, Tajimi (JP); Kimihiko Ando, Toyota (JP); Yoshihisa Ueda, Nagoakakyo (JP); Yusaku Yoshida, Tajimi (JP); Masaru Sugimoto, Tajimi (JP); Toshiyuki Sawada, Himeji (JP); Shingo Fukumoto, Himeji (JP)

(73) Assignees: TOYOTA JIDOSHA KABUSHIKI KAISHA, Toyota-shi, Aichi-ken (JP); FINE SINTER CO., LTD, Kasugai-shi, Aichi (JP); SANYO SPECIAL STEEL CO., LTD, Himeji-shi, Hyogo (JP)

( * ) Notice: Subject to any disclaimer, the term of this patent is extended or adjusted under 35 U.S.C. 154(b) by 0 days.

(21) Appl. No.: 15/421,787

(22) Filed: Feb. 1, 2017

(65) Prior Publication Data
US 2017/0225231 A1    Aug. 10, 2017

(30) Foreign Application Priority Data
Feb. 4, 2016    (JP) .................................. 2016-019963

(51) Int. Cl.
*B22F 7/00*    (2006.01)
*B22F 3/16*    (2006.01)
(Continued)

(52) U.S. Cl.
CPC ................ *B22F 7/008* (2013.01); *B22F 3/16* (2013.01); *B32B 15/01* (2013.01); *B32B 15/18* (2013.01);
(Continued)

(58) Field of Classification Search
CPC ........ B22F 7/008; B22F 3/16; B22F 2301/35; B22F 2302/40; B22F 2998/10;
(Continued)

(56) References Cited

U.S. PATENT DOCUMENTS

2004/0103753 A1    6/2004  Ando
2005/0252338 A1*   11/2005 Henmi ................ C22C 32/0089
                                              75/246

FOREIGN PATENT DOCUMENTS

JP    2004-156101 A    6/2004

OTHER PUBLICATIONS

U.S. Appl. No. 15/412,597.

* cited by examiner

*Primary Examiner* — Michael E. La Villa
(74) *Attorney, Agent, or Firm* — Sughrue Mion, PLLC

(57) ABSTRACT

Mixed powder that contains first hard particles, second hard particles, graphite particles, and iron particles is used to manufacture a sintered alloy. The first hard particle is a Fe—Mo—Cr—Mn based alloy particle, the second hard particle is a Fe—Mo—Si based alloy particle. The mixed powder contains 5 to 50 mass % of the first hard particles, 1 to 8 mass % of the second hard particles, and 0.5 to 1.0 mass % of the graphite particles when total mass of the first hard particles, the second hard particles, the graphite particles, and the iron particles is set as 100 mass %.

10 Claims, 9 Drawing Sheets

(51) Int. Cl.
    *C22C 38/38*     (2006.01)
    *C22C 27/04*     (2006.01)
    *C22C 38/04*     (2006.01)
    *C22C 38/02*     (2006.01)
    *C22C 38/22*     (2006.01)
    *B32B 15/18*     (2006.01)
    *B32B 15/01*     (2006.01)
    *C22C 27/06*     (2006.01)
    *C22C 1/05*     (2006.01)
    *C22C 1/04*     (2006.01)
    *C22C 29/02*     (2006.01)
    *C22C 38/00*     (2006.01)
    *C22C 1/10*     (2006.01)
    *C22C 45/10*     (2006.01)
    *C22C 45/02*     (2006.01)
    *C22C 30/00*     (2006.01)
    *C22C 38/12*     (2006.01)
    *C22C 38/44*     (2006.01)

(52) U.S. Cl.
    CPC ............... *C22C 1/04* (2013.01); *C22C 1/05* (2013.01); *C22C 1/051* (2013.01); *C22C 1/053* (2013.01); *C22C 1/055* (2013.01); *C22C 1/10* (2013.01); *C22C 27/04* (2013.01); *C22C 27/06* (2013.01); *C22C 29/02* (2013.01); *C22C 30/00* (2013.01); *C22C 38/00* (2013.01); *C22C 38/02* (2013.01); *C22C 38/04* (2013.01); *C22C 38/12* (2013.01); *C22C 38/22* (2013.01); *C22C 38/38* (2013.01); *C22C 38/44* (2013.01); *C22C 45/02* (2013.01); *C22C 45/10* (2013.01); *B22F 2301/35* (2013.01); *B22F 2302/40* (2013.01); *B22F 2304/10* (2013.01); *B22F 2998/10* (2013.01); *Y10T 428/1209* (2015.01); *Y10T 428/12028* (2015.01); *Y10T 428/12042* (2015.01); *Y10T 428/12056* (2015.01); *Y10T 428/12125* (2015.01); *Y10T 428/12132* (2015.01); *Y10T 428/12139* (2015.01); *Y10T 428/12146* (2015.01); *Y10T 428/12153* (2015.01); *Y10T 428/12229* (2015.01); *Y10T 428/12479* (2015.01); *Y10T 428/12951* (2015.01); *Y10T 428/12958* (2015.01); *Y10T 428/12972* (2015.01); *Y10T 428/12979* (2015.01)

(58) Field of Classification Search
    CPC ..... B22F 2304/10; B32B 15/01; B32B 15/18; B32B 2305/026; Y10T 428/12028; Y10T 428/12042; Y10T 428/12056; Y10T 428/1209; Y10T 428/12125; Y10T 428/12132; Y10T 428/12139; Y10T 428/12146; Y10T 428/12153; Y10T 428/12229; Y10T 428/12479; Y10T 428/12951; Y10T 428/12958; Y10T 428/12972; Y10T 428/12979; C22C 38/38; C22C 38/22; C22C 38/04; C22C 38/02; C22C 27/04; C22C 1/05; C22C 1/051; C22C 1/053; C22C 1/055; C22C 1/10; C22C 29/02; C22C 1/04; C22C 27/06; C22C 38/00; C22C 38/12; C22C 38/44; C22C 45/02; C22C 45/10; C22C 30/00

See application file for complete search history.

EXAMPLE 1

COMPARATIVE EXAMPLE 2

EXAMPLE 1

COMPARATIVE EXAMPLE 2

4 μm

100 μm

COMPARATIVE EXAMPLE 7

COMPARATIVE EXAMPLE 8

MELTING OF HARD PARTICLES

MANUFACTURING METHOD OF SINTERED ALLOY, COMPACT FOR SINTERING, AND SINTERED ALLOY

INCORPORATION BY REFERENCE

The disclosure of Japanese Patent Application No. 2016-019963 filed on Feb. 4, 2016 including the specification, drawings and abstract is incorporated herein by reference in its entirety.

BACKGROUND

1. Technical Field

The disclosure relates to a manufacturing method of a sintered alloy, a sintered-alloy compact, and a sintered alloy.

2. Description of Related Art

There is a case where a sintered alloy with an iron matrix is used for a valve seat and the like of an internal combustion engine. There is also a case where hard particles are contained in a sintered alloy to improve wear resistance. In the case where the hard particles are contained, graphite particles and iron particles are mixed with the hard particles into a powder form and press the mixed powder into a sintered-alloy compact. Thereafter, the sintered-alloy compact is heated and sintered into a sintered alloy.

As a manufacturing method of such a sintered alloy, a manufacturing method of a wear-resistant iron-based sintered alloy has been suggested (for example, see Japanese Patent Application Publication No. 2004-156101 (JP 2004-156101 A)). In the manufacturing method of the wear-resistant iron-based sintered alloy, mixed powder of hard particles, graphite particles, and iron particles is pressed into a sintered-alloy compact. Then, the sintered-alloy compact is sintered while carbons (C) in the graphite particles of this sintered-alloy compact are diffused into the hard particles and the iron particles.

Here, the hard particles contain 20 to 70 mass % of Mo, 0.2 to 3 mass % of C, 1 to 15 mass % of Mn, and the remainder is formed with inevitable impurities and Co. When total mass of the hard particles, the graphite particles, and the iron particles is set as 100 mass %, the mixed powder contains 10 to 60 mass % of the hard particles and 0.2 to 2 mass % of the graphite particles. Because the hard particles are diffused in such a sintered alloy, abrasive wear of the sintered alloy can be suppressed.

SUMMARY

However, a matrix material that binds the hard particles in the sintered alloy, which is manufactured by the manufacturing method described in JP 2004-156101 A, is a Fe—C system based material, in which C in the graphite particles are diffused into the iron particles, and is thus soft. Accordingly, when the sintered alloy contacts a metallic material in a mated sliding member, plastic deformation of a contact surface of the sintered alloy is facilitated, and adhesive wear of this contact surface is facilitated. In order to avoid these, hardness of the sintered alloy is desirably increased. However, the increased hardness of the sintered alloy results in decreased machinability. Therefore, it is difficult to balance adhesive wear resistance and the machinability.

The disclosure provides a manufacturing method of a sintered alloy, a sintered-alloy compact, and a sintered alloy capable of securing machinability while suppressing adhesive wear.

The inventors have considered that the adhesive wear of the contact surface is promoted by the plastic deformation of the iron-based matrix of the sintered alloy, as described above. From such a perspective, the inventors have examined to add another type of hard particles that can suppress the plastic deformation of the iron-based matrix in addition to the conventional hard particles that suppress the abrasive wear. For this reason, the inventors have focused their attention on molybdenum as a main component of the hard particles and reached such a finding that the plastic deformation of the iron-based matrix can be controlled by scattering iron-molybdenum intermetallic compounds and molybdenum carbides precipitated during sintering in the iron-based matrix.

The disclosure is based on such a finding. A first aspect of the disclosure relates to a manufacturing method of a sintered alloy that includes: pressing mixed powder that contains first hard particles, second hard particles, graphite particles, and iron particles into a sintered-alloy compact; and sintering the sintered-alloy compact while diffusing carbons in the graphite particles of the sintered-alloy compact into the first hard particles, the second hard particles, and the iron particles. In the first aspect of the disclosure, the first hard particles contain 10 to 50 mass % of Mo, 3 to 20 mass % of Cr, 2 to 15 mass % of Mn, 1 mass % or less of C, and a remainder including Fe and inevitable impurities when the first hard particles have 100 mass %. The second hard particles contain 60 to 70 mass % of Mo, 2 mass % or less of Si, and a remainder including Fe and inevitable impurities when the second hard particles have 100 mass %. The mixed powder contains 5 to 50 mass % of the first hard particles, 1 to 8 mass % of the second hard particles, and 0.5 to 1.0 mass % of the graphite particles when total mass of the first hard particles, the second hard particles, the graphite particles, and the iron particles is set as 100 mass %.

A second aspect of the disclosure is a sintered-alloy compact that contains: first hard particles that contain 10 to 50 mass % of Mo, 3 to 20 mass % of Cr, 2 to 15 mass % of Mn, 1 mass % or less of C, and a remainder including Fe and inevitable impurities when the first hard particles have 100 mass %; second hard particles that contain 60 to 70 mass % of Mo, 2 mass % or less of Si, and a remainder including Fe and inevitable impurities when the second hard particles have 100 mass %; graphite particles; and iron particles. The sintered-alloy compact contains 5 to 50 mass % of the first hard particles, 1 to 8 mass % of the second hard particles, and 0.5 to 1.0 mass % of the graphite particles when total mass of the first hard particles, the second hard particles, the graphite particles, and the iron particles is set as 100 mass %. A third aspect of the disclosure is a sintered alloy as a sintered body of the sintered-alloy compact.

According to the disclosure, machinability of the sintered alloy can be secured while adhesive wear thereof is suppressed.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
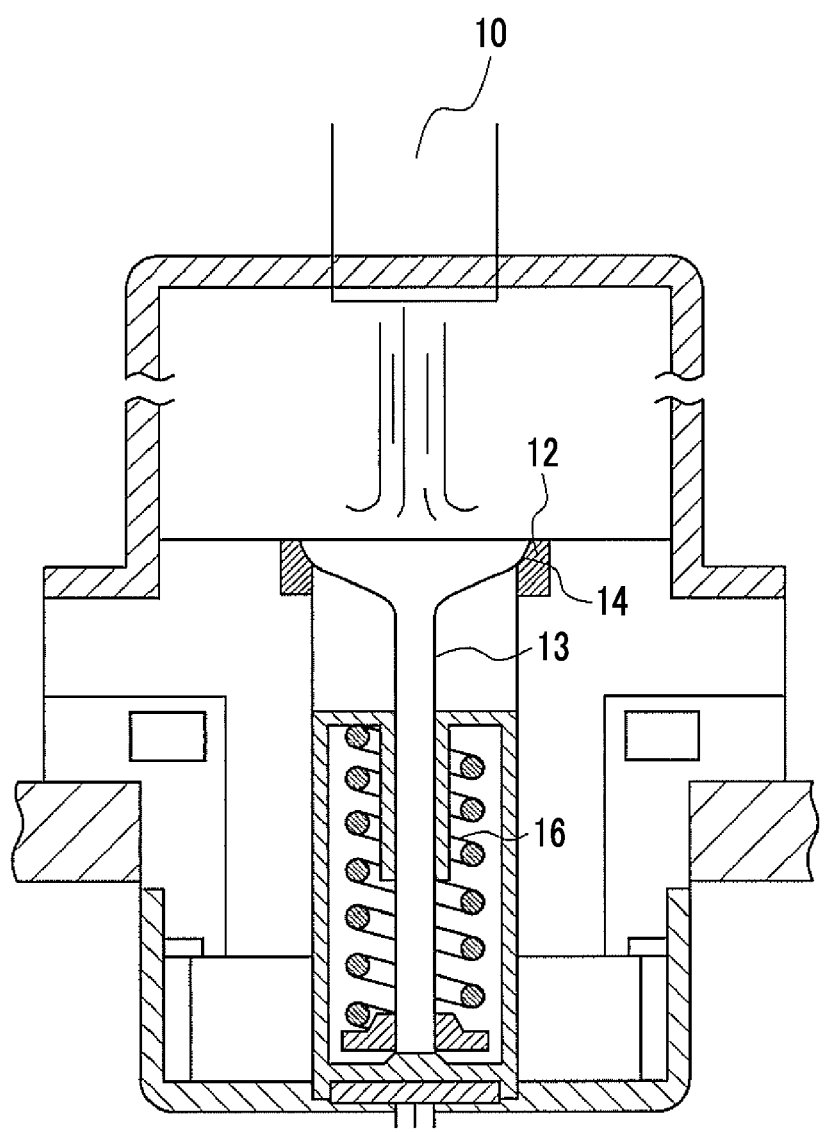
FIG. 1 is a schematic conceptual diagram of a wear test that is used in an example and a comparative example.

A detailed description will hereinafter be made on an embodiment of the disclosure. A sintered-alloy compact (hereinafter referred to as a compact) according to this embodiment is formed by compacting mixed powder containing first and second hard particles, graphite particles, and iron particles, which will be described below. A wear-resistant iron-based sintered alloy (hereinafter referred to as a sintered alloy) is formed by sintering the compact while diffusing carbons (C) in the graphite particles into the hard particles and the iron particles. A description will be made on the following hard particles, the compact formed by compacting the mixed powder that contains the hard particles, and the sintered alloy formed by sintering the compact.

1. About First Hard Particles

The first hard particles are blended as a raw material in the sintered alloy, are particles whose hardness is higher than that of the iron particles and an iron-based matrix of the sintered alloy, and are particles that are used for a purpose of suppressing abrasive wear of the sintered alloy by increasing strength of the matrix while securing toughness of the sintered alloy.

The first hard particles are particles that include a Fe—Mo—Cr—Mn based alloy. More specifically, the first hard particles contain 10 to 50 mass % of Mo, 3 to 20 mass % of Cr, 2 to 15 mass % of Mn, 1 mass % or less of C, and the remainder formed with Fe and inevitable impurities.

Molten metal that contains the above-described composition blended in the above-described ratio is prepared, and this molten metal is atomized in an atomization process. In this way, the first hard particles can be manufactured. As another method, a solidified body that is formed by solidifying the molten metal may be ground mechanically. Either one of a gas atomization process and a liquid atomization process may be adopted as the atomization process. However, in consideration of sinterability and the like, the gas atomization process, through which rounded particles are obtained, is preferred.

Here, the upper limit values and the lower limit values of the composition of the above-described hard particles can be appropriately changed in accordance with a degree of importance of each property of a member, for which the hard particles are used, in consideration of a reason for limitation on the composition, which will be described below, as well as hardness, solid lubricity, adhesiveness, cost, or the like within the limitation.

1-1. Mo: 10 to 50 Mass %

Of the composition of the first hard particles, Mo can produce Mo carbides with C in the graphite particles during sintering and improve the hardness and wear resistance of the first hard particles. Furthermore, Mo and Mo carbides in a solid solution are oxidized under a high-temperature use environment to produce Mo oxide films. In this way, Mo allows the sintered alloy to have favorable solid lubricity.

In the case where content of Mo is less than 10 mass %, only a small amount of the Mo carbides is produced. In addition, an oxidation starting temperature of the first hard particles is increased, which suppresses production of Mo oxides under the high-temperature use environment. As a result, the produced sintered alloy has the insufficient solid lubricity and decreased abrasive wear resistance.

On the other hand, in the case where content of Mo exceeds 50 mass %, it becomes difficult to manufacture the hard particles by an atomization method. In addition, adhesiveness between the hard particles and the iron-based matrix is possibly decreased. Thus, the further preferred content of Mo is 25 to 35 mass %.

1-2. Cr: 3 to 20 Mass %

Of the composition of the first hard particles, Cr can produce Cr carbides, improve the hardness and the wear resistance of the first hard particles, and improve adhesiveness between the hard particles and the matrix. In addition, Cr can suppress excess oxidation of the first hard particles.

In the case where content of Cr is less than 3 mass %, the adhesiveness between the first hard particles and the matrix is not sufficiently improved. Furthermore, production of the oxide films in the first hard particles is increased, which possibly results in peeling of the oxide films in the first hard particles.

On the other hand, in the case where the content of Cr exceeds 20 mass %, the first hard particles become excessively hard, and aggressiveness thereof against a mated member is increased. In addition, production of the oxide films in the first hard particles is excessively suppressed. Thus, the further preferred content of Cr is 5 to 10 mass %.

1-3. Mn: 2 to 15 Mass %

Of the composition of the first hard particles, Mn is efficiently diffused from the first hard particles into the iron-based matrix of the sintered alloy during sintering. Thus, Mn can improve the adhesiveness between the first hard particles and the iron-based matrix. Furthermore, Mn can increase an austenitic structure in each of a matrix of the first hard particles and the iron-based matrix of the sintered alloy.

In the case where content of Mn is less than 2 mass %, a small amount of Mn is diffused into the iron-based matrix, and thus the adhesiveness between the hard particles and the iron-based matrix is decreased. Furthermore, mechanical strength of the obtained sintered alloy is decreased. On the other hand, in the case where the content of Mn exceeds 15 mass %, the above-described effect of Mn is saturated. Thus, the preferred content of Mn is 2 to 10 mass %, and the further preferred content of Mn is 4 to 8 mass %.

1-4. C: 1 Mass % or Less

Of the composition of the first hard particles, C can bind with Mo to produce the Mo carbides and improve the hardness and the wear resistance of the first hard particles. In this embodiment, content of C is limited to 1 mass % or less. In this way, C can improve a compaction property of the compact and increase density of the sintered alloy. In the case where the content of C exceeds 1 mass %, the compaction property is decreased, which reduces density of the sintered alloy.

1-5. Particle Diameter of the First Hard Particle

A particle diameter of the first hard particle can be appropriately selected in accordance with application, a type, and the like of the sintered alloy. However, the particle diameter of the first hard particle preferably falls within a range of 44 to 250 μm and further preferably falls within a range of 44 to 105 μm.

In the case where the first hard particles contain a hard particle whose particle diameter is smaller than 44 μm, the particle diameter is extremely small. As a result, the wear resistance of the wear-resistant iron-based sintered alloy is possibly decreased. On the other hand, the first hard particles contain a hard particle whose particle diameter exceeds 105 μm, the particle diameter is extremely large. As a result, machinability of the wear-resistant iron-based sintered alloy is possibly decreased.

2. About the Second Hard Particles

Similar to the first hard particles, the second hard particles are blended as a raw material in the sintered alloy and are particles whose hardness is higher than that of the iron particles and the iron-based matrix of the sintered alloy. Even a slight additive amount of the second hard particles can dramatically increase the hardness of the sintered alloy. Thus, the second hard particles are particles that are used for a purpose of suppressing the plastic deformation of the iron-based matrix of the sintered alloy and thereby reducing the adhesive wear of the sintered alloy.

The second hard particles are particles that include a Fe—Mo based alloy. When the second hard particles have 100 mass %, the second hard particles contain 60 to 70 mass % of Mo, 2 mass % or less of Si, and the remainder formed with Fe and inevitable impurities.

The second hard particles are manufactured by mechanically grinding a solidified body into a powder form, the solidified body being formed by solidifying the molten metal. Alternatively, like the first hard particles, the second hard particles may be manufactured through the gas atomization process, the liquid atomization process, or the like.

2-1. Mo: 60 to 70 Mass %

Of composition of the second hard particles, Mo can produce Mo carbides with C in the graphite particles during sintering and improve hardness and wear resistance of the second hard particles. Furthermore, Mo and Mo carbides in the solid solution are oxidized under the high-temperature use environment to produce the Mo oxide films. In this way, Mo allows the sintered alloy to have the favorable solid lubricity. In particular, the second hard particles have higher content of Mo than the first hard particles. Thus, by precipitating the Mo carbides on a grain boundary of the iron-based matrix during sintering, the plastic deformation of the iron-based matrix during use can be suppressed, and the adhesive wear thereof can be suppressed.

In the case where content of Mo is less than 60 mass %, it becomes difficult to suppress the plastic deformation of the iron-based matrix by the Mo carbides as described above, and adhesive wear resistance of the iron-based matrix is decreased. On the other hand, in the case where the content of Mo exceeds 70 mass %, it becomes difficult to manufacture the second hard particles by a grinding method, which decreases a yield rate of the second hard particles.

2-2. Si: 2 Mass % or Less

In the case where Si is contained in the composition of the second hard particles, manufacturing of the second hard particles by the grinding method is facilitated. In the case where content of Si exceeds 2 mass %, the second hard particles are hardened. As a result, the compaction property of the compact is decreased, which reduces the density of the sintered alloy. In addition, the machinability of the sintered alloy is decreased.

2-3. Particle Diameter of the Second Hard Particle

A particle diameter of the second hard particle can be appropriately selected in accordance with the application, the type, and the like of the sintered alloy. However, the particle diameter (a maximum particle diameter) of the second hard particle preferably falls within a range of 75 μm and smaller. In this way, the second hard particles can further uniformly be diffused into the matrix, which can increase the hardness of the sintered alloy. In the case where the second hard particles contain a hard particle whose particle diameter exceeds 75 μm, the particle diameter is extremely large. As a result, the machinability of the sintered alloy is possibly decreased. From a manufacturing perspective, the particle diameter of the second hard particle is preferably 1 μm or larger.

3. About the Graphite Particles

The graphite particles may be graphite particles of either natural graphite or artificial graphite or may be mixed graphite particles of the natural graphite and the artificial graphite as long as C in the graphite particles can be diffused as a solid solution into the iron-based matrix and the hard particles during sintering. A particle diameter of the graphite article preferably falls within a range of 1 to 45 μm. As powder containing the preferred graphite particles, graphite powder (CPB-S: manufactured by Nippon Graphite Industries, Co., Ltd.) and the like can be raised.

4. About the Iron Particles

The iron particles that serve as the matrix of the sintered alloy include iron particles that have Fe as a main component. Pure iron powder is preferred as powder containing the iron particles. However, low-alloy steel powder may be used as long as the compaction property during compaction is not decreased and the diffusion of Mn atoms and the like in the above-described first hard particles is not inhibited. Fe—C based powder can be adopted as the low-alloy steel powder. For example, when the low-alloy steel powder has 100 mass %, the low-alloy steel powder that contains 0.2 to 5 mass % of C and the remainder formed with inevitable impurities and Fe as composition can be adopted. In addition, the powder of this composition may be gas-atomized powder, liquid-atomized powder, or reduced powder. A particle diameter of the iron particle preferably falls within a range of 150 μm and smaller.

5. About a Mixture Ratio of the Mixed Powder

The mixed powder is produced to include the first hard particles, the second hard particles, the graphite particles, and the iron particles. When total mass of the first hard particles, the second hard particles, the graphite particles, and the iron particles is set as 100 mass %, the mixed powder contains 5 to 50 mass % of the first hard particles, 1 to 8 mass % of the second hard particles, and 0.5 to 1.0 mass % of the graphite particles.

The mixed powder may include the first hard particles, the second hard particles, the graphite particles, and the iron particles and may contain several mass % of another particle with decrease in the mechanical strength and the wear resistance of the obtained sintered alloy being prevented as a premise. In this case, effects of the sintered alloy can sufficiently be expected when the total mass of the first hard particles, the second hard particles, the graphite particles, and the iron particles is 95 mass % or more of the mixed powder. For example, the mixed powder may contain at least one type of machinability-improving particles selected from a group of sulfide (for example, MnS), oxide (for example, $CaCO_3$), fluoride (for example, CaF), nitride (for example, BN), and oxysulfide.

Because the first hard particles occupy 5 to 50 mass % of the total mass of the first hard particles, the second hard particles, the graphite particles, and the iron particles, both of the mechanical strength and the abrasive wear resistance of the sintered alloy can be improved.

In the case where the first hard particles only occupy less than 5 mass % of the total mass of this composition, as it will be apparent from an experiment by the inventors, which will be described below, an effect of the abrasive wear resistance by the first hard particles cannot sufficiently be exerted.

On the other hand, in the case where the first hard particles occupy more than 50 mass % of the total mass of this composition, an amount of the first hard particles is excessively large. Thus, even when an attempt is made to compact the mixed powder, the compact cannot easily be produced. In addition, mutual contact among the first hard particles is increased, and sintered portions of the iron particles are reduced. As a result, the density of the sintered alloy is reduced, which degrades the wear resistance thereof. Furthermore, since the ratio of the first hard particles to the sintered alloy is increased, the machinability of the sintered alloy is decreased.

Because the second hard particles occupy 1 to 8 mass % of the total mass of the first hard particles, the second hard particles, the graphite particles, and the iron particles, as described above, the plastic deformation of the iron-based matrix during use can be suppressed, and the adhesive wear of the sintered alloy can be reduced.

In the case where the second hard particles only occupy less than 1 mass % of the total mass of this composition, as it will be apparent from the experiment by the inventors, which will be described below, the iron-based matrix of the sintered alloy is more likely to be plastically deformed, and this portion is more likely to be plucked. As a result, the adhesive wear of the sintered alloy occurs. On the other hand, in the case where the second hard particles occupy more than 8 mass % of the total mass of this composition, as it will be apparent from the experiment by the inventors, which will be described below, the ratio of the second hard particles to the sintered alloy is increased. Thus, the machinability of the sintered alloy is decreased.

Because the graphite particles occupy 0.5 to 1.0 mass % of the total mass of the first hard particles, the second hard particles, the graphite particles, and the iron particles, C in the graphite particles can be diffused as the solid solution into the first and second hard particles after sintering without melting the first and second hard particles. Furthermore, a pearlitic structure can be secured in the iron-based matrix. In this way, both of the mechanical strength and the wear resistance of the sintered alloy can be improved.

In the case where the graphite particles only occupy less than 0.5 mass % of the total mass of this composition, a ferritic structure of the iron-based matrix tends to be increased, which degrades strength of the iron-based matrix itself in the sintered alloy. On the other hand, in the case where the graphite particles occupy more than 1.0 mass % of the total mass of this composition, the diffusion of C into the first hard particles and the second hard particles becomes excessive, and melting points of the first hard particles and the second hard particles are lowered. As a result, the first hard particles and the second hard particles are melted due to heating during sintering, which degrades the density of the sintered alloy.

6. About a Manufacturing Method of the Wear-Resistant Iron-Based Sintered Alloy

The thus-obtained mixed powder is pressed into the sintered-alloy compact. The sintered-alloy compact contains the first hard particles, the second hard particles, the graphite particles, and the iron particles at the same ratio as the mixed powder.

The pressed sintered-alloy compact is sintered while C in the graphite particles of the sintered-alloy compact is diffused into the first hard particles, the second hard particles, and the iron particles. The wear-resistant iron-based sintered alloy is thereby manufactured. At this time, diffusion of iron from the iron-based matrix (the iron particles) into the first hard particles and the second hard particles is increased. Since the content of C in the first hard particles is limited and the second hard particles do not contain C, the diffusion of C in the graphite particles into the first and second hard particles is facilitated. In particular, because the second hard particles contain a larger amount of Mo than the first hard particles, Mo carbides are produced on a grain boundary of the second hard particles. In this way, the hardness of the sintered alloy can further effectively be increased.

A sintering temperature of approximately 1050 to 1250° C., particularly 1100 to 1150° C. can be adopted. Duration of sintering for 30 minutes to 120 minutes, preferably 45 minutes to 90 minutes at the above sintering temperature can be adopted. A sintering atmosphere may be a non-oxidizing atmosphere such as an inert gas atmosphere. A nitrogen gas atmosphere, an argon gas atmosphere, or a vacuum atmosphere can be raised as the non-oxidizing atmosphere.

In order to secure the hardness, the matrix of the iron-based sintered alloy, which is obtained by sintering, preferably contains a structure including pearlite. The structure including pearlite may be the pearlitic structure, a pearlite-austenite-based mixed structure, or a pearlite-ferrite-based mixed structure. In order to secure the wear resistance, an amount of ferrite whose hardness is low is preferably small.

According to the above-described method, the sintered alloy that contains 1.0 to 31.0 mass % of Mo, 0.01 to 10 mass % of Cr, 0.1 to 7.5 mass % of Mn, 0.2 mass % or less of Si, 0.5 to 1.0 mass % of C, and the remainder formed with iron and inevitable impurities can be obtained.

7. Application of the Wear-Resistant Iron-Based Sintered Alloy

The sintered alloy that is obtained by the above-described manufacturing method has higher mechanical strength and wear resistance than the conventional sintered alloy under the high-temperature use environment. For example, the sintered alloy can be favorably used for a valve system (for example, a valve seat, a valve guide) of an internal combustion engine that uses compressed natural gas or liquefied petroleum gas as fuel and for a waste gate valve of a turbocharger under a high-temperature use environment.

For example, even if the valve seat of an exhaust valve of the internal combustion engine is formed of the sintered alloy and if such wear, in which adhesive wear during contact of the valve seat and the valve and abrasive wear at a time when the valve slides with respect to the valve seat are mixed, occurs, the wear resistance of the valve seat can be significantly improved when compared to that in the related art. In particular, the Mo oxide films are less likely to be produced under the use environment where the compressed natural gas or the liquefied petroleum gas is used as the fuel. However, the adhesive wear can be reduced even under such an environment.

A description will hereinafter be made on examples and comparative examples.

Example 1

A sintered alloy according to Example 1 was manufactured by the following manufacturing method. As the first hard particles, hard particles (manufactured by Sanyo Special Steel Co., Ltd.) were prepared. The hard particles were produced from an alloy that contained 30 mass % of Mo, 5 mass % of Cr, 6 mass % of Mn, and the remainder formed with Fe and inevitable impurities (that is, Fe-30Mo-5Cr-6Mn) by a gas atomizing method. A sieve that complies with JIS Standard Z8801 was used to classify the first hard particles into a range of 44 μm to 250 μm. Note that values classified by this method are used as "the particle size (the particle diameter) of the particle" in this specification.

As the second hard particles, second hard particles (manufactured by KINSEI MATEC CO., LTD.) were prepared. The second hard particles were produced from a Fe-65Mo-1Si alloy that contains 65 mass % of Mo, 1 mass % of Si, and the remainder formed with Fe and inevitable impurities by a grinding method. The second hard particles were classified into a range of 75 μm and smaller.

Next, the graphite powder including the graphite particles (CPB-S: manufactured by Nippon Graphite Industries, Co., Ltd.) and reduced iron powder including pure iron particles (JIP255M-90: manufactured by JFE Steel Corporation) were prepared. It was set such that the above-described first hard particles occupied 20 mass %, the above-described second hard particles occupied 3 mass %, the graphite particles occupied 0.85 mass %, and the iron particles occupied the rest (76.15 mass %), and mixture of this composition was mixed by a V-shaped mixer for 30 minutes. In this way, mixed powder was obtained.

Next, a die was used to compact the obtained mixed powder into a ring-shaped test piece through application of pressure of 784 MPa, and a sintered-alloy compact (a pressed compact) was thereby formed. The pressed compact was sintered at 1120° C. for 60 minutes under the inert atmosphere (nitrogen gas atmosphere). In this way, a test piece of the sintered alloy (the valve seat) according to Example 1 is formed.

Examples 2, 3

Test pieces of the sintered alloy were produced in the same manner as Example 1. As shown in Table 1, Example 2 differs from Example 1 in such a way that the composition of the first hard particles was Fe-30Mo-10Cr-6Mn (Cr was increased to occupy 10 mass %).

As shown in Table 1, Example 3 differs from Example 1 in such a way that the composition of the first hard particles was Fe-35Mo-10Cr-6Mn (Mo was increased to occupy 35 mass %, and Cr was increased to occupy 10 mass %).

Comparative Example 1

A test piece of the sintered alloy was produced in the same manner as Example 1. As shown in Table 1, Comparative Example 1 differs from Example 1 in points that particles including a Co-40Mo-6Mn-0.9C alloy and corresponding to the hard particles described in JP 2004-156101 A was used as the first hard particles and that the second hard particles were not added. Note that an additive amount of the graphite particles also differed as shown in Table 1.

Comparative Example 2

A test piece of the sintered alloy was produced in the same manner as Example 1. As shown in Table 1, Comparative Example 2 differs from Example 1 in points that the composition of the first hard particles was Fe-35Mo-10Cr-6Mn (Mo was increased to occupy 35 mass %, and Cr was increased to occupy 10 mass %) and that the second hard particles were not added.

<Wear Test>

A tester in FIG. 1 was used to perform a wear test on the test pieces of the sintered alloy according to Examples 1 to 3 and Comparative Examples 1, 2, and the wear resistance of these pieces was evaluated. In this test, as shown in FIG. 1, a propane gas burner 10 was used as a heating source, and a sliding section between a ring-shaped valve seat 12 and a valve face 14 of a valve 13 was placed under a propane gas combustion atmosphere. The valve seat 12 was formed of the sintered alloy produced as described above. The valve face 14 was formed of EV 12 (the SAE Standard) that had undergone nitrocarburizing treatment. A temperature of the valve seat 12 was controlled at 250° C. A spring 16 applied a load of 25 kgf to the valve seat 12 and the valve face 14 during contact thereof. The valve seat 12 and the valve face 14 were brought into contact with each other at a rate of 3250 times/minute, and the wear test was performed for 8 hours. In Examples 1 to 3 and Comparative Examples 1, 2, a total amount of axial wear depth of the valve seat 12 and the valve face 14 after the wear test was measured as an axial wear amount. This result is shown in Table 1.

Figure 3A:
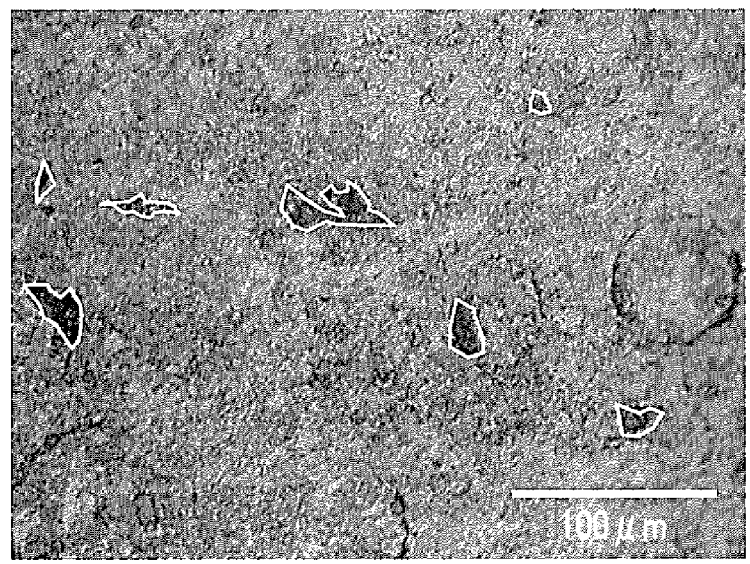
FIG. 3A is an image of a surface of a test piece according to Example 1 after the wear test.
Figure 3B:
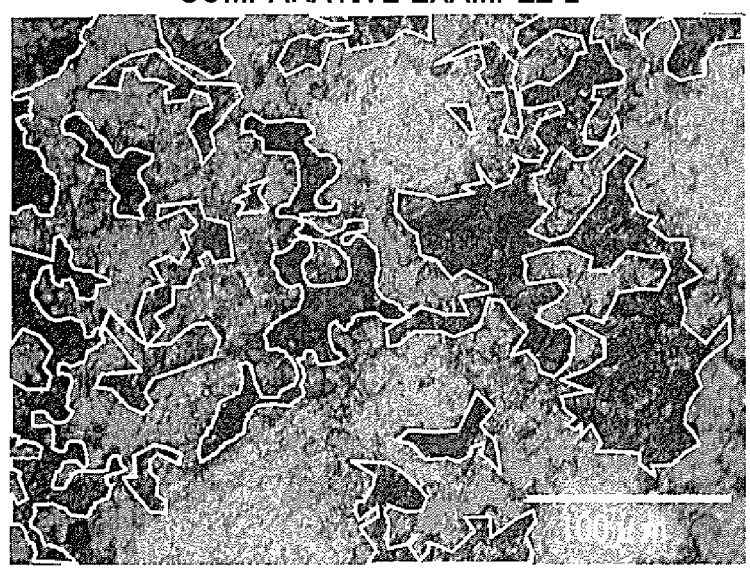
FIG. 3B is an image of a surface of a test piece according to Comparative Example 2 after the wear test.

Surfaces of the test pieces according to Example 1 and Comparative Example 2 after the wear test were observed by using a microscope. This result is shown in FIG. 3A and FIG. 3B. FIG. 3A is an image of the surface of the test piece according to Example 1 after the wear test, and FIG. 3B is an image of the surface of the test piece according to Comparative Example 2 after the wear test.

Figure 4A:
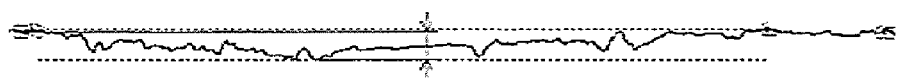
FIG. 4A shows surface profiles of the test pieces according to Example 1 and Comparative Example 2 after the wear test.
Figure 4A:
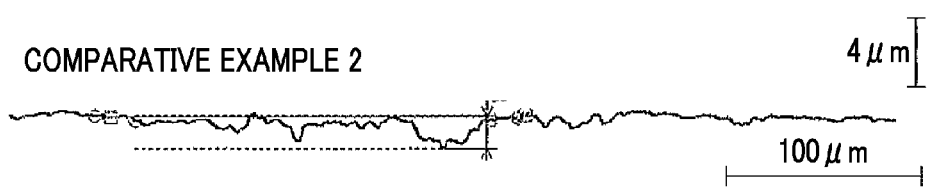
Figure 4B:
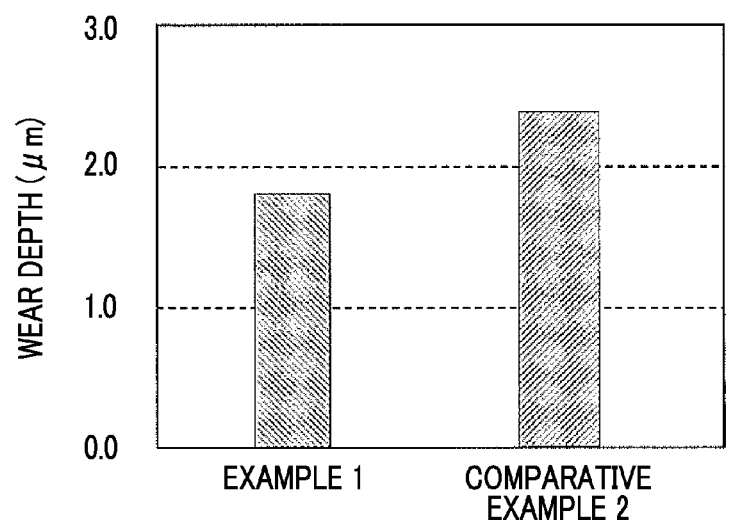
FIG. 4B is a graph that shows results of wear depth of the test pieces according to Example 1 and Comparative Example 2.

The above-described wear test was further performed on the test pieces according to Example 1 and Comparative Example 2 at a temperature of 200° C., at which the surfaces of the test pieces were less likely to be oxidized. Then, surface profiles according to Example 1 and Comparative Example 2 after the wear test were measured, and the wear depth was measured from the measured surface profiles. This result is shown in FIG. 4A and FIG. 4B. FIG. 4A shows the surface profiles of the test pieces according to Example 1 and Comparative Example 2 after the wear test, and FIG.

4B is a graph that shows the results of the wear depth of the test pieces according to Example 1 and Comparative Example 2.

<Machinability Test>

Figure 2:
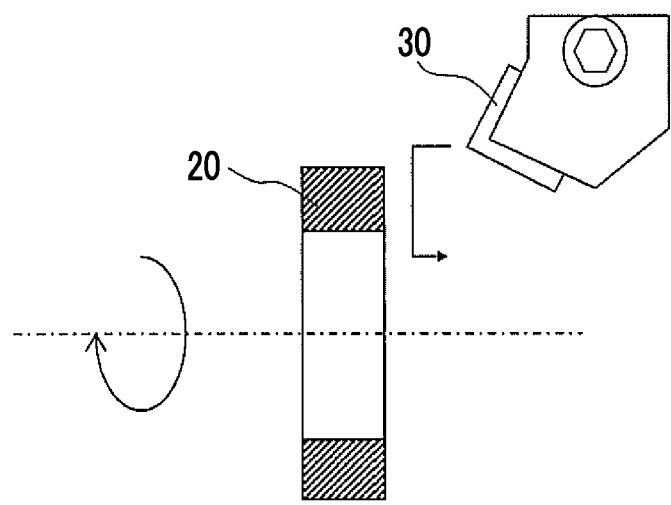
FIG. 2 is a schematic conceptual diagram of a machinability test that is used in the example and a comparative example.

A tester shown in FIG. 2 was used to perform a machinability test on the sintered alloys according to Examples 1 to 3 and Comparative Examples 1, 2, so as to evaluate the machinability thereof. In this test, six test pieces 20 were prepared for each of Examples 1 to 3 and Comparative Examples 1, 2, and each of the test pieces 20 had an outer diameter of 30 mm, an inner diameter of 22 mm, and total length of 9 mm. An NC lathe was used, and each of the test pieces 20 that rotated at a rotational frequency of 970 rpm was subjected to wet traverse cutting with a cutting amount of 0.3 mm, a feeding rate of 0.08 mm/rev, and a cutting distance of 320 m by a carbide cutter 30 that was coated with titanium nitride aluminum. Thereafter, maximum wear depth of a flank of the cutter 30 was measured as a cutter wear amount by using an optical microscope. This result is shown in Table 1.

In the wear test that was performed under the temperature environment of 200° C., as shown in FIG. 4A, it was confirmed that plucked-liked portions existed on the surface profile of the test piece in Comparative Example 2 and thus the adhesive wear occurred. Meanwhile, there was hardly any plucked-like portion existed on the surface profile of the test piece in Example 1.

From what has been described so far, it is considered that the adhesive wear was reduced by adding the second hard particles in Examples 1 to 3 and that the axial wear amounts in Examples 1 to 3 became smaller than those in Comparative Examples 1, 2.

Note that the amount of Mo and the amount of Cr in the first hard particles were changed in Examples 1 to 3; however, the axial wear amounts and the cutter wear amounts were almost the same. Thus, an influence of the addition of Mo and Cr on the wear resistance and the machinability is small. Therefore, it is assumed that such

TABLE 1

|  | First hard particles | | Second hard particles | | | Graphite particles |
| --- | --- | --- | --- | --- | --- | --- |
|  | Compositions | Additive amount (mass %) | Compositions | Particle size (μm) | Additive amount (mass %) | Additive amount (mass %) |
| Example 1 | Fe—30Mo—5Cr—6Mn | 20 | Fe—65Mo—1Si | to 75 | 3 | 0.85 |
| Example 2 | Fe—30Mo—10Cr—6Mn | 20 | Fe—65Mo—1Si | to 75 | 3 | 0.85 |
| Example 3 | Fe—35Mo—10Cr—6Mn | 20 | Fe—65Mo—1Si | to 75 | 3 | 0.85 |
| Comparative Example 1 | Co—40Mo—6Mn—0.9C | 40 | N/A | | | 1.10 |
| Comparative Example 2 | Fe—35Mo—10Cr—6Mn | 20 | N/A | | | 0.85 |

|  | Sintered body Compositions (mass %) | Wear resistance Axial wear amount (μm) | Machinability Cutter wear amount (μm) |
| --- | --- | --- | --- |
| Example 1 | Fe—8.0Mo—1.0Cr—1.2Mn—0.03Si—0.8C | 51 | 60 |
| Example 2 | Fe—8.0Mo—2.0Cr—1.2Mn—0.03Si—0.8C | 53 | 62 |
| Example 3 | Fe—9.0Mo—2.0Cr—1.2Mn—0.03Si—0.8C | 55 | 75 |
| Comparative Example 1 | Fe—16.0Mo—21.0Co—2.4Mn—1.1C | 79 | 107 |
| Comparative Example 2 | Fe—7.0Mo—2.0Cr—1.2Mn—0.8C | 80 | 56 |

(Result 1)

As shown in Table 1, the additive amount of the first hard particles and the additive amount of the graphite particles were smaller in Examples 1 to 3 than those in Comparative Example 1. Meanwhile, the axial wear amounts in Examples 1 to 3 were each smaller than that in Comparative Example 1, and the cutter wear amounts in Examples 1 to 3 were each smaller than that in Comparative Example 1. Furthermore, the axial wear amount in Comparative Example 2 was larger than any of the axial wear amounts in Examples 1 to 3.

In Comparative Example 1 and Comparative Example 2, the adhesive wear was found on the surfaces of the sintered alloys cut by the cutter. Meanwhile, in Examples 1 to 3, the adhesive wear was hardly found on the surfaces of the sintered alloys cut by the cutter. More specifically, in Example 1, slight plucked marks by the adhesive wear partially existed on portions surrounded by white lines in FIG. 3A. Meanwhile, in Comparative Example 2, the plucked marks by the adhesive wear existed on entire black portions surrounded by white lines in FIG. 3B.

effects can be expected when the composition of the first hard particles falls within the above-described ranges of the disclosure.

Examples 4 to 7: An Optimum Additive Amount of the First Hard Particles

Test pieces of the sintered alloy were produced in the same manner as Example 1. Examples 4 to 7 are examples that were implemented to evaluate an optimum additive amount of the first hard particles.

As shown in Table 2, Example 4 differs from Example 1 in such a way that the first hard particles occupying 5 mass % of the entire mixed powder were added. A test piece of the sintered alloy in Example 5 was the same as that in Example 1.

As shown in Table 2, Example 6 differs from Example 1 in points that the first hard particles occupying 40 mass % of the entire mixed powder were added and that the composition of the first hard particles was Fe-25Mo-5Cr-6Mn (Mo was reduced to occupy 25 mass %).

As shown in Table 2, Example 7 differs from Example 1 in points that the first hard particles occupying 50 mass % of the entire mixed powder were added and that the composition of the first hard particles was Fe-30Mo-10Cr-6Mn (Cr was increased to occupy 10 mass %).

Comparative Examples 3, 4: Comparative Examples of the Optimum Additive Amount of the First Hard Particles Test pieces of the sintered alloy were produced in the same manner as Example 1. Comparative Examples 3, 4 are comparative examples that were implemented to evaluate the optimum additive amount of the first hard particles. As shown in Table 2, Comparative Examples 3, 4 differ from Example 1 in such a way that the first hard particles respectively occupying 0 mass % (that is, was not added) and 60 mass % of the entire mixed powder were added. Note that, in Comparative Example 4, the mixed powder could not be compacted.

Figure 5A:
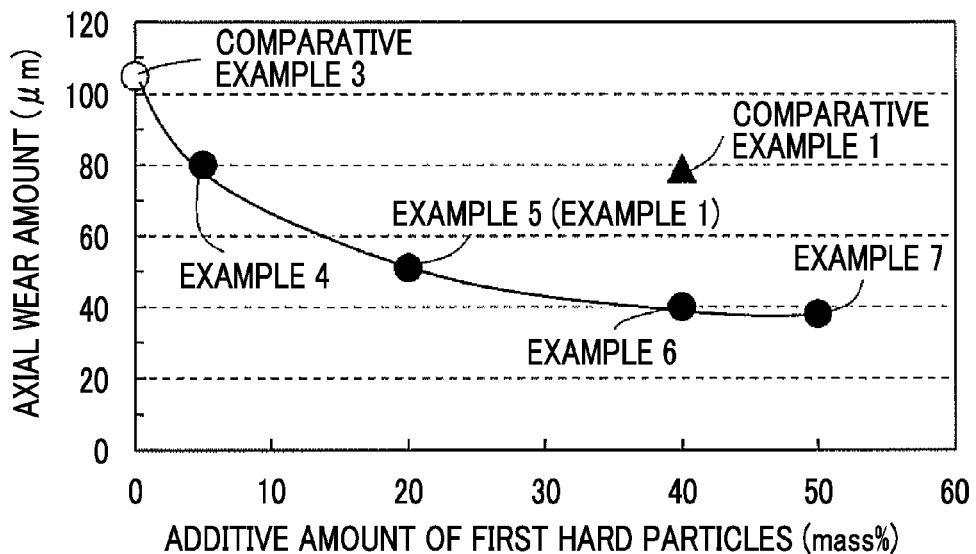
FIG. 5A is a graph that shows results of an axial wear amount after the wear test in Examples 4 to 7 and Comparative Examples 1, 3.

Similar to Example 1, the wear test was performed on the test pieces in Examples 4 to 7 and Comparative Example 3, and the axial wear amounts after the wear test were measured. This result is shown in Table 2 and FIG. 5A. FIG. 5A is a graph that shows the results of the axial wear amount after the wear test in Examples 4 to 7 and Comparative Examples 1, 3, and the result of above-described Comparative Example 1 is also shown in FIG. 5A.

Figure 5B:
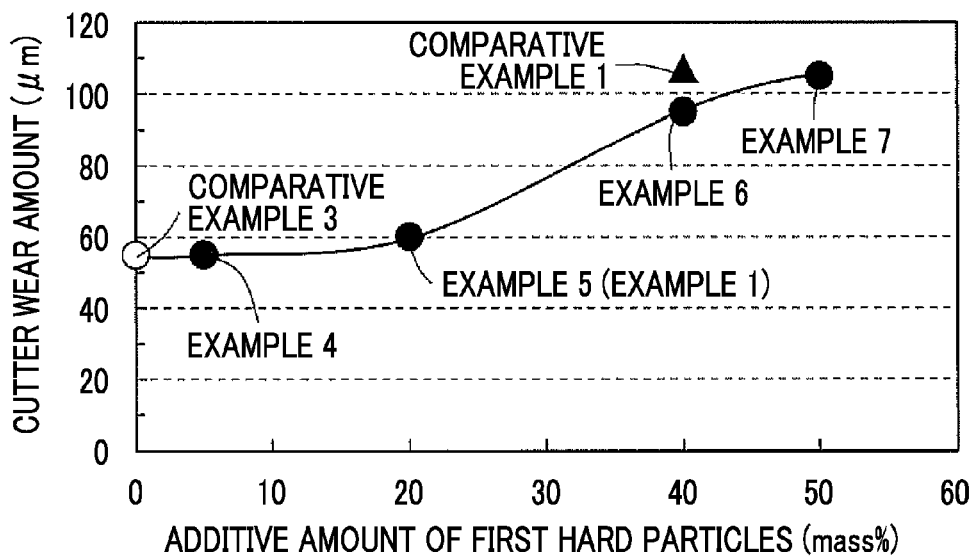
FIG. 5B is a graph that shows results of a cutter wear amount after the machinability test in Examples 4 to 7 and Comparative Examples 1, 3.

Similar to Example 1, the machinability test was performed on the test pieces in Examples 4 to 7 and Comparative Example 3, and the cutter wear amounts after the machinability test were measured. This result is shown in Table 2 and FIG. 5B. FIG. 5B is a graph that shows the results of the cutter wear amount after the machinability test in Examples 4 to 7 and Comparative Examples 1, 3, and the result of above-described Comparative Example 1 is also shown in FIG. 5B.

TABLE 2

| | First hard particles | | Second hard particles | | | Graphite particles |
|---|---|---|---|---|---|---|
| | Compositions | Additive amount (mass %) | Compositions | Particle size (μm) | Additive amount (mass %) | Additive amount (mass %) |
| Comparative Example 3 | Fe—30Mo—5Cr—6Mn | 0 | Fe—65Mo—1Si | to 75 | 3 | 0.85 |
| Example 4 | Fe—30Mo—5Cr—6Mn | 5 | Fe—65Mo—1Si | to 75 | 3 | 0.85 |
| Example 5 | Fe—35Mo—5Cr—6Mn | 20 | Fe—65Mo—1Si | to 75 | 3 | 0.85 |
| Example 6 | Fe—25Mo—5Cr—6Mn | 40 | Fe—65Mo—1Si | to 75 | 3 | 0.85 |
| Example 7 | Fe—30Mo—10Cr—6Mn | 50 | Fe—65Mo—1Si | to 75 | 3 | 0.85 |
| Comparative Example 4 | Fe—30Mo—5Cr—6Mn | 60 | Fe—65Mo—1Si | to 75 | 3 | 0.85 |

| | Sintered body Compositions (mass %) | Wear resistance Axial wear amount (μm) | Machinability Cutter wear amount (μm) |
|---|---|---|---|
| Comparative Example 3 | Fe—2.0Mo—0.03Si—0.8C | 105 | 55 |
| Example 4 | Fe—3.5Mo—0.3Cr—0.3Mn—0.03Si—0.8C | 80 | 55 |
| Example 5 | Fe—8.0Mo—1.0Cr—1.2Mn—0.03Si—0.8C | 51 | 60 |
| Example 6 | Fe—12.0Mo—2.0Cr—2.4Mn—0.03Si—0.8C | 40 | 95 |
| Example 7 | Fe—17.0Mo—5.0Cr—3.0Mn—0.03Si—0.8C | 38 | 105 |
| Comparative Example 4 | Fe—20.0Mo—3.0Cr—3.6Mn—0.03Si—0.8C | Could not be compacted | Could not be compacted |

(Result 2: The Optimum Additive Amount of the First Hard Particles)

As shown in FIG. 5A, the axial wear amounts in Examples 4 to 7 were smaller than that in Comparative Example 3. The axial wear amount was reduced in an order of Examples 4 to 7. In addition, the adhesive wear was hardly found on surfaces of the test pieces in Examples 4 to 7. From what has been described so far, it is considered that the abrasive wear resistance of the sintered alloy is improved by adding the first hard particles. Meanwhile, it is also considered that the compaction property of the compact was decreased in Comparative Example 4 due to excess addition of the first hard particles. In conclusion, the preferred additive amount of the first hard particles is 5 to 50 mass % of the mixed powder.

As shown in FIG. 5B, the cutter wear amounts in Examples 4 to 7 were smaller than that in Comparative Example 1, and the cutter wear amount was increased in the order of Examples 4 to 7. As shown in FIG. 5A, the axial wear amount in Example 4 is substantially the same as that in Comparative Example 1. However, as shown in FIG. 5B, the cutter wear amount in Example 4 is smaller than that in Comparative Example 1. From what has been described so far, it is considered that the sintered alloy, which is obtained by adding the first hard particles and the second hard particles as in Examples 4 to 7, can improve the machinability while securing the wear resistance.

Examples 8 to 10: An Optimum Additive Amount of the Second Hard Particles

Test pieces of the sintered alloy were produced in the same manner as Example 1. Examples 8 to 10 are examples that were implemented to evaluate an optimum additive amount of the second hard particles.

As shown in Table 3, Example 8 differs from Example 1 in such a way that the second hard particles occupying 1 mass % of the entire mixed powder were added.

As shown in Table 3, Example 9 differs from Example 1 in such a way that the composition of the first hard particles was Fe-30Mo-10Cr-6Mn (Cr was increased to occupy 10 mass %), and the test piece of the sintered alloy in Example 9 is the same as that in Example 2.

As shown in Table 3, Example 10 differs from Example 1 in such a way that the second hard particles occupying 8 mass % of the entire mixed powder were added. Example 10 further differs from Example 1 in such a way that the composition of the first hard particles was Fe-25Mo-10Cr-6Mn (Mo was reduced to occupy 25 mass %, and Cr was increased to occupy 10 mass %).

Comparative Examples 5, 6: Comparative Examples of the Optimum Additive Amount of the Second Hard Particles Test pieces of the sintered alloy were produced in the same manner as Example 8. Comparative Examples 5, 6 are comparative examples that were implemented to evaluate the optimum additive amount of the second hard particles.

As shown in Table 3, Comparative Example 5 differs from Example 1 in such a way that the second hard particles were not added (0 mass %). Comparative Example 5 further differs from Example 1 in such a way that the composition of the first hard particles was Fe-35Mo-10Cr-6Mn (Mo was increased to occupy 35 mass %, and Cr was increased to occupy 10 mass %). The test piece of the sintered alloy in Comparative Example 5 is the same as that in Comparative Example 2.

As shown in Table 3, Comparative Example 6 differs from Example 1 in such a way that the second hard particles occupying 10 mass % of the entire mixed powder were added. Comparative Example 6 further differs from Example 1 in such a way that the composition of the first hard particles was Fe-25Mo-5Cr-6Mn (Mo was reduced to occupy 25 mass %).

Figure 6A:
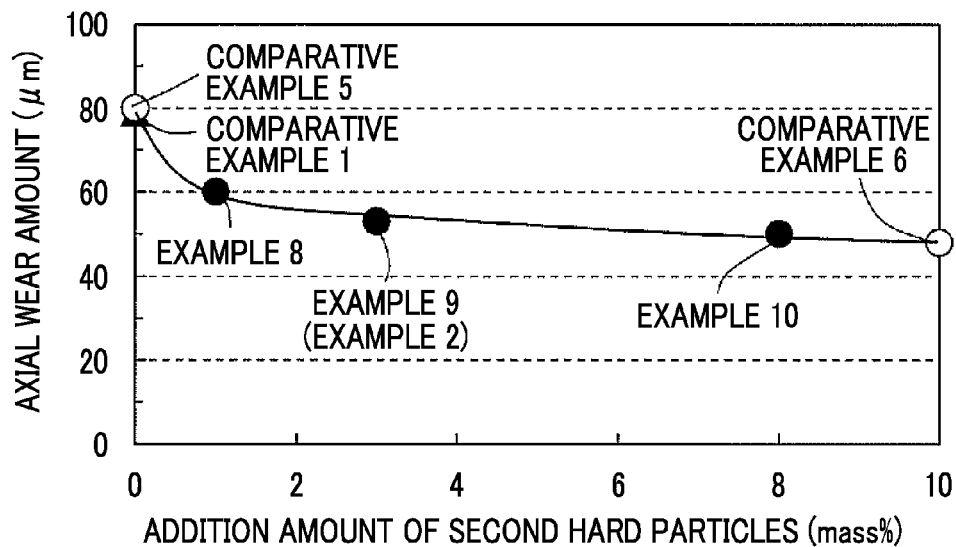
FIG. 6A is a graph that shows results of the axial wear amount after the wear test in Examples 8 to 10 and Comparative Examples 1, 5, 6.

Similar to Example 1, the wear test was performed on the test pieces in Examples 8 to 10 and Comparative Examples 5, 6, and the axial wear amounts after the wear test were measured. This result is shown in Table 3 and FIG. 6A. FIG. 6A is a graph that shows the results of the axial wear amount after the wear test in Examples 8 to 10 and Comparative Examples 1, 5, 6, and the result of above-described Comparative Example 1 is also shown in FIG. 6A.

Figure 6B:
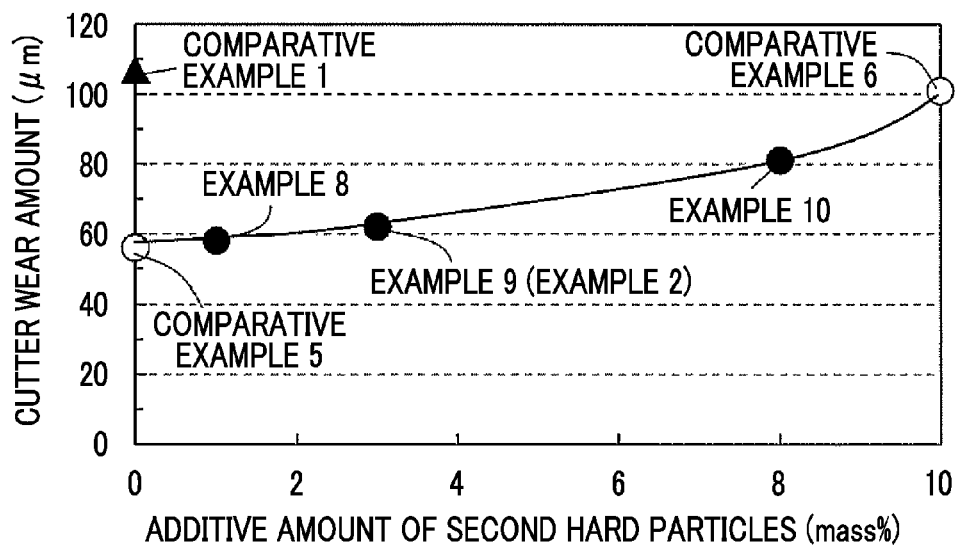
FIG. 6B is a graph that indicates results of the cutter wear amount after the machinability test in Examples 8 to 10 and Comparative Examples 1, 5, 6.

Similar to Example 1, the machinability test was performed on the test pieces in Examples 8 to 10 and Comparative Examples 5, 6, and the cutter wear amounts after the machinability test were measured. This result is shown in Table 3 and FIG. 6B. FIG. 6B is a graph that shows the results of the cutter wear amount after the machinability test in Examples 8 to 10 and Comparative Examples 1, 5, 6, and the result of above-described Comparative Example 1 is also shown in FIG. 6B.

TABLE 3

| | First hard particles | | Second hard particles | | | Graphite particles |
|---|---|---|---|---|---|---|
| | Compositions | Additive amount (mass %) | Compositions | Particle size (μm) | Additive amount (mass %) | Additive amount (mass %) |
| Comparative Example 5 | Fe—35Mo—10Cr—6Mn | 20 | Fe—65Mo—1Si | to 75 | 0 | 0.85 |
| Example 8 | Fe—30Mo—5Cr—6Mn | 20 | Fe—65Mo—1Si | to 75 | 1 | 0.85 |
| Example 9 | Fe—30Mo—10Cr—6Mn | 20 | Fe—65Mo—1Si | to 75 | 3 | 0.85 |
| Example 10 | Fe—25Mo—10Cr—6Mn | 20 | Fe—65Mo—1Si | to 75 | 8 | 0.85 |

TABLE 3-continued

| | | | | | |
|---|---|---|---|---|---|
| Comparative Example 6 | Fe—25Mo—5Cr—6Mn | 20 | Fe—65Mo—1Si | to 75 | 10 | 0.85 |

| | Sintered body Compositions (mass %) | Wear resistance Axial wear amount (μm) | Machinability Cutter wear amount (μm) |
|---|---|---|---|
| Comparative Example 5 | Fe—7.0Mo—2.0Cr—1.2Mn—0.8C | 80 | 56 |
| Example 8 | Fe—6.7Mo—1.0Cr—1.2Mn—0.01Si—0.8C | 60 | 58 |
| Example 9 | Fe—8.0Mo—2.0Cr—1.2Mn—0.03Si—0.8C | 53 | 62 |
| Example 10 | Fe—10.2Mo—2.0Cr—1.2Mn—0.08Si—0.8C | 50 | 81 |
| Comparative Example 6 | Fe—11.5Mo—1.0Cr—1.2Mn—0.10Si—0.8C | 48 | 101 |

(Result 3: The Optimum Additive Amount of the Second Hard Particles)

As shown in FIG. 6A, the axial wear amounts in Examples 8 to 10 and Comparative Example 6 were smaller than those in Comparative Examples 1, 5. The axial wear amount was slightly reduced in an order of Examples 8 to 10 and Comparative Example 6. Meanwhile, as shown in FIG. 6B, the cutter wear amount in Comparative Example 6 was larger than those in Examples 8 to 10.

From what has been described so far, it is considered that the second hard particles suppress the plastic deformation of the iron-based matrix of the sintered alloy during use and reduce the adhesive wear of the sintered alloy by improving the hardness of the sintered alloy after sintering. More specifically, the second hard particles contain a larger amount of Mo than the first hard particles and can harden the iron-based matrix than the first hard particles. Thus, it is considered that the hardness of the iron-based matrix after sintering was improved by precipitating Mo carbides on the grain boundary of the iron-based matrix during sintering. Meanwhile, it is considered that, when the second hard particles are excessively added as in Comparative Example 6, the sintered alloy after sintering becomes excessively hard, which degrades the machinability. From the result that has been described so far, the preferred additive amount of the second hard particles is 1 to 8 mass % of the mixed powder.

Examples 11 to 13: An Optimum Additive Amount of the Graphite Particles

Test pieces of the sintered alloy were produced in the same manner as Example 1. Examples 11 to 13 are examples that were implemented to evaluate an optimum additive amount of the graphite particles.

As shown in Table 4, Example 11 differs from Example 1 in such a way that the graphite particles occupying 0.5 mass % of the entire mixed powder were added. Example 11 further differs from Example 1 in such a way that the composition of the first hard particles was Fe-30Mo-10Cr-6Mn (Cr was increased to occupy 10 mass %).

As shown in Table 4, Example 12 differs from Example 1 in such a way that the composition of the first hard particles was Fe-35Mo-10Cr-6Mn (Mo was increased to occupy 35 mass %, and Cr was increased to occupy 10 mass %). The test piece of the sintered alloy in Example 12 is the same as that in Example 3.

As shown in Table 4, Example 13 differs from Example 1 in such a way that the graphite particles occupying 1.0 mass % of the entire mixed powder were added. Example 13 further differs from Example 1 in such a way that the composition of the first hard particles was Fe-25Mo-5Cr-6Mn (Mo was reduced to occupy 25 mass %).

Comparative Examples 7, 8: Comparative Examples of the Optimum Additive Amount of the Graphite Particles Test pieces of the sintered alloy were produced in the same manner as Example 1. Comparative Examples 7, 8 are comparative examples that were implemented to evaluate the optimum additive amount of the graphite particles.

As shown in Table 4, Comparative Example 7 differs from Example 1 in such a way that the graphite particles occupying 0.4 mass % of the entire mixed powder were added. Comparative Example 7 further differs from Example 1 in such a way that the composition of the first hard particles was Fe-25Mo-5Cr-6Mn (Mo was reduced to occupy 25 mass %).

As shown in Table 4, Comparative Example 8 differs from Example 1 in such a way that the graphite particles occupying 1.10 mass % of the entire mixed powder were added.

Figure 7A:
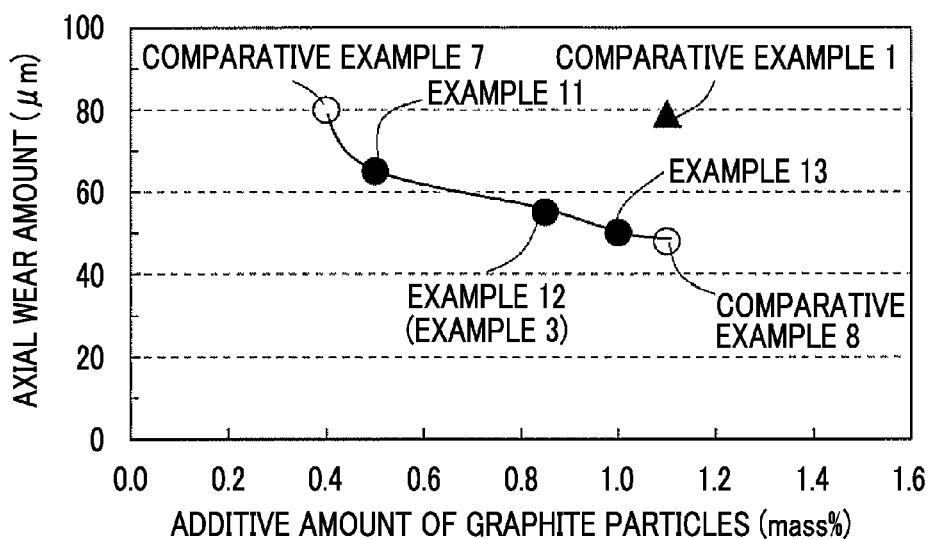
FIG. 7A is a graph that shows results of the axial wear amount after the wear test in Examples 11 to 13 and Comparative Examples 1, 7, 8.

Similar to Example 1, the wear test was performed on the test pieces in Examples 11 to 13 and Comparative Examples 7, 8, and the axial wear amounts after the wear test were measured. This result is shown in Table 4 and FIG. 7A. FIG. 7A is a graph that shows the results of the axial wear amount after the wear test in Examples 11 to 13 and Comparative Examples 1, 7, 8, and the result of above-described Comparative Example 1 is also shown in FIG. 7A.

Figure 7B:
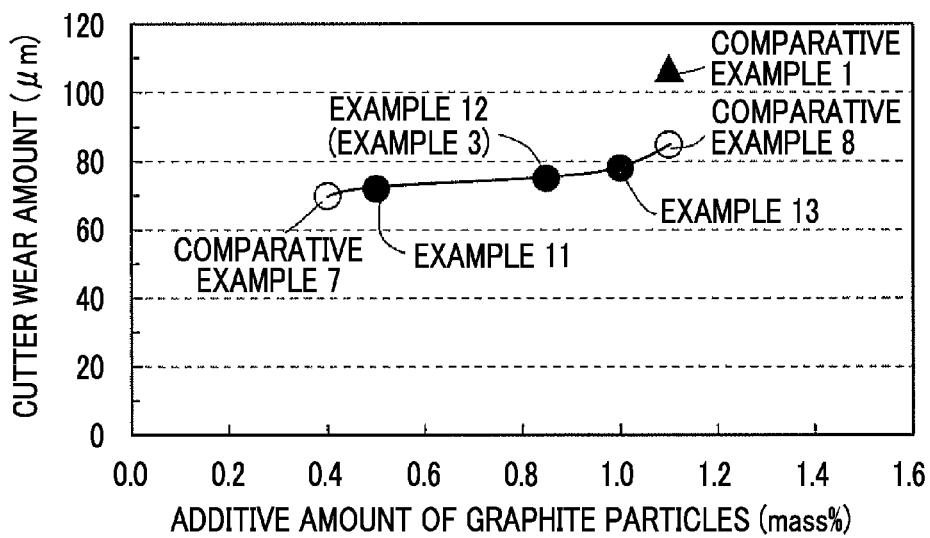
FIG. 7B is a graph that shows results of the cutter wear amount after the machinability test in Examples 11 to 13 and Comparative Examples 1, 7, 8.

Similar to Example 1, the machinability test was performed on the test pieces in Examples 11 to 13 and Comparative Examples 7, 8, and the cutter wear amounts after the machinability test were measured. This result is shown in Table 4 and FIG. 7B. FIG. 7B is a graph that shows the results of the cutter wear amount after the machinability test in Examples 11 to 13 and Comparative Examples 1, 7, 8, and the result of above-described Comparative Example 1 is also shown in FIG. 7B.

Figure 8A:
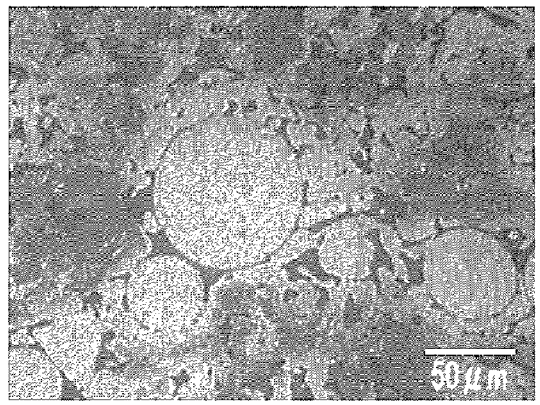
FIG. 8A is an image of a structure of the test piece according to Example 1.
Figure 8B:
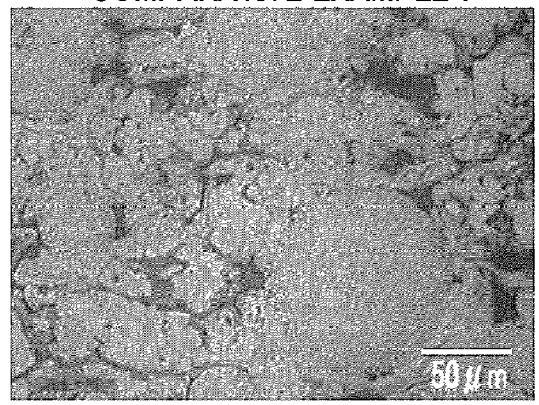
FIG. 8B is an image of a structure of a test piece according to Comparative Example 7.
Figure 8C:
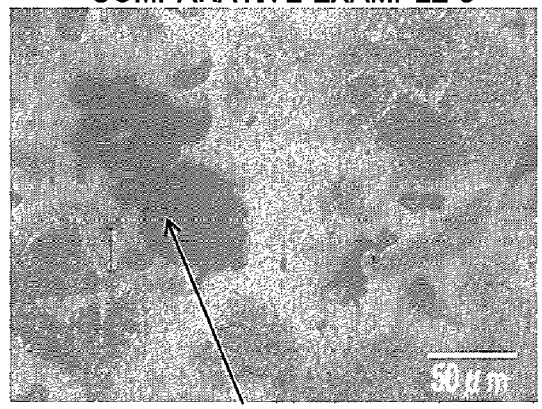
FIG. 8C is an image of a structure of a test piece according to Comparative Example 8.

The test piece according to Example 1 that has been produced above and the test pieces according to Comparative Examples 7, 8 were etched by using Nital, and structures of the sintered alloys were observed by using the microscope. This result is shown in FIG. 8A to FIG. 8C. FIG. 8A is an image of the structure of the test piece according to Example 1, FIG. 8B is an image of the structure of the test piece according to Comparative Example 7, and FIG. 8C is an image of the structure of the test piece according to Comparative Example 8.

TABLE 4

| | First hard particles | | Second hard particles | | | Graphite particles |
|---|---|---|---|---|---|---|
| | Compositions | Additive amount (mass %) | Compositions | Particle size (μm) | Additive amount (mass %) | Additive amount (mass %) |
| Comparative Example 7 | Fe—25Mo—5Cr—6Mn | 20 | Fe—65Mo—1Si | to 75 | 3 | 0.40 |
| Example 11 | Fe—30Mo—10Cr—6Mn | 20 | Fe—65Mo—1Si | to 75 | 3 | 0.50 |
| Example 12 | Fe—35Mo—10Cr—6Mn | 20 | Fe—65Mo—1Si | to 75 | 3 | 0.85 |
| Example 13 | Fe—25Mo—5Cr—6Mn | 20 | Fe—65Mo—1Si | to 75 | 3 | 1.00 |
| Comparative Example 8 | Fe—30Mo—5Cr—6Mn | 20 | Fe—65Mo—1Si | to 75 | 3 | 1.10 |

| | Sintered body Compositions (mass %) | Wear resistance Axial wear amount (μm) | Machinability Cutter wear amount (μm) |
|---|---|---|---|
| Comparative Example 7 | Fe—7.0Mo—1.0Cr—1.2Mn—0.03Si—0.4C | 80 | 70 |
| Example 11 | Fe—8.0Mo—2.0Cr—1.2Mn—0.03Si—0.5C | 65 | 72 |
| Example 12 | Fe—9.0Mo—2.0Cr—1.2Mn—0.03Si—0.8C | 55 | 75 |
| Example 13 | Fe—7.0Mo—1.0Cr—1.2Mn—0.03Si—0.9C | 50 | 78 |
| Comparative Example 8 | Fe—8.0Mo—1.0Cr—1.2Mn—0.03Si—1.0C | 48 | 85 |

(Result 4: The Optimum Additive Amount of the Graphite Particles)

As shown in FIG. 7A, the axial wear amounts in Examples 11 to 13 and Comparative Example 8 were smaller than that in Comparative Example 7. Meanwhile, as shown in FIG. 7B, the cutter wear amount in Comparative Example 8 was larger than those in Examples 11 to 13.

As shown in FIG. 8A, the pearlitic structure is formed in the structure of the sintered alloy shown in Example 1. It is considered that the pearlitic structure is also formed in the structures of the sintered alloys in Examples 11 to 13. However, as shown in FIG. 8B, the structure of the sintered alloy shown in Comparative Example 7 is mainly composed of ferrite. Thus, the hardness of the iron-based matrix thereof is lower than the others. It is considered that the axial wear amount in Comparative Example 7 thereby became larger than those in Examples 11 to 13 and Comparative Example 8.

Meanwhile, as shown in FIG. 8C, the diffusion of C into the (first and second) hard particles was excessive in the structure of the sintered alloy in Comparative Example 8 due to the increased mass of the graphite particles. Accordingly, the melting points of the (first and second) hard particles were lowered, and the (first and second) hard particles were melted due to heating during sintering, which decreased the density of the sintered alloy. It is considered that the machinability of the sintered alloy in Comparative Example 8 was thereby decreased. From what has been described so far, the preferred additive amount of the graphite particles is 0.5 to 1.0 mass % of the mixed powder.

Examples 14, 15: An Optimum Particle Diameter of the Second Hard Particle

Test pieces of the sintered alloy were produced in the same manner as Example 1. Examples 14, 15 are examples that were implemented to evaluate an optimum particle diameter of the second hard particle. As shown in Table 5, Examples 14, 15 differ from Example 1 in such a way that the second hard particles to be used were classified such that the particle diameter (particle size) thereof respectively falls within a range of 45 μm and smaller and a range over 45 μm to 75 μm. Example 15 further differs from Example 1 in such a way that the composition of the first hard particles was Fe-30Mo-10Cr-6Mn (Cr was increased to occupy 10 mass %).

Comparative Examples 9, 10: Comparative Examples of the Optimum Particle Diameter of the Second Hard Particle Test pieces of the sintered alloy were produced in the same manner as Example 1. Comparative Examples 9, 10 were comparative examples that were implemented to evaluate the optimum particle diameter of the second hard particle. As shown in Table 5, Comparative Examples 9, 10 differ from Example 1 in such a way that the second hard particles to be used were classified such that the particle diameter (particle size) thereof respectively falls within a range over 75 μm to 100 μm and a range over 100 μm to 150 μm. Comparative Example 9 further differs from Example 1 in such a way that the composition of the first hard particles was Fe-25Mo-10Cr-6Mn (Mo was reduced to occupy 25 mass %, and Cr was increased to occupy 10 mass %). Comparative Example 10 further differs from Example 1 in such a way that the composition of the first hard particles was Fe-35Mo-10Cr-6Mn (Mo was increased to occupy 35 mass %, and Cr was increased to occupy 10 mass %). Note that the test pieces according to Comparative Examples 9, 10 are of the sintered alloys that are included in the scope of the disclosure, and are named as Comparative Examples 9, 10 as a matter of convenience for a purpose of making a comparison with Examples 14, 15.

Figure 9A:
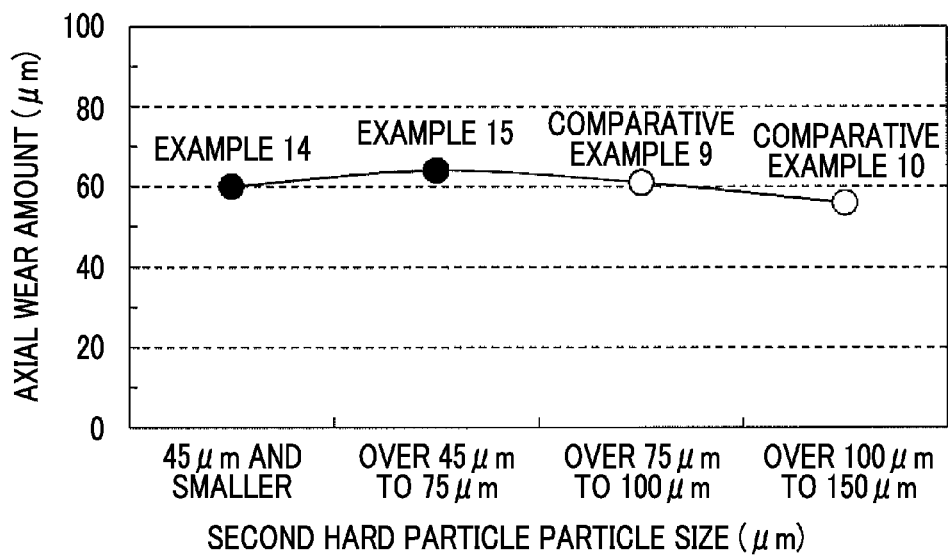
FIG. 9A is a graph that shows results of the axial wear amounts after the wear test in Examples 14, 15 and Comparative Examples 9, 10.

Similar to Example 1, the wear test was performed on the test pieces in Examples 14, 15 and Comparative Examples 9, 10 to measure the axial wear amounts after the wear test. This result is shown in Table 5 and FIG. 9A. FIG. 9A is a graph that shows the results of the axial wear amounts after the wear test in Examples 14, 15 and Comparative Examples 9, 10.

Figure 9B:
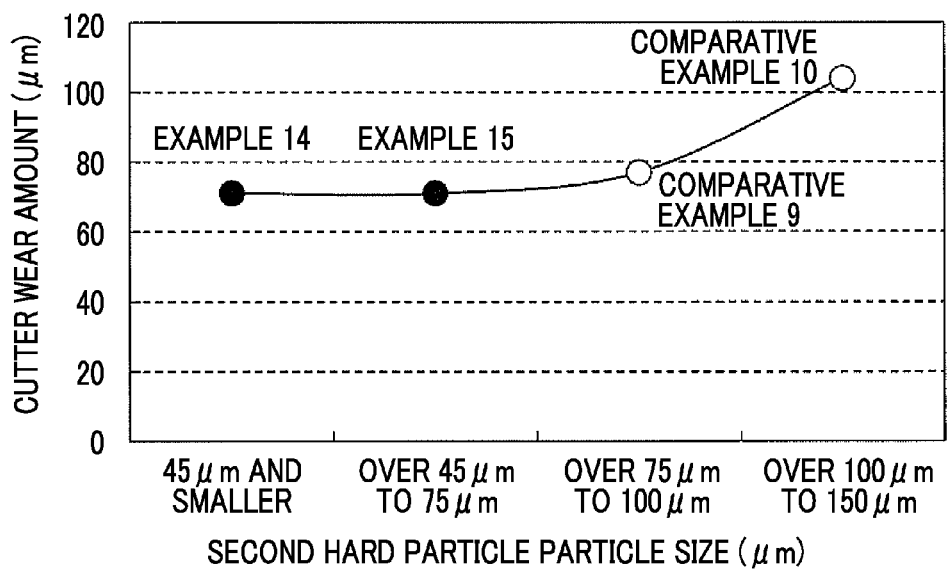
FIG. 9B is a graph that shows results of the cutter wear amounts after the machinability test in Examples 14, 15 and Comparative Examples 9, 10.

Similar to Example 1, the machinability test was performed on the test pieces in Examples 14, 15 and Comparative Examples 9, 10 to measure the cutter wear amounts after the machinability test. This result is shown in Table 5 and FIG. 9B. FIG. 9B is a graph that shows the results of the cutter wear amounts after the machinability test in Examples 14, 15 and Comparative Examples 9, 10.

TABLE 5

| | First hard particles | | Second hard particles | | | Graphite particles |
|---|---|---|---|---|---|---|
| | Compositions | Additive amount (mass %) | Compositions | Particle size (μm) | Additive amount (mass %) | Additive amount (mass %) |
| Example 14 | Fe—30Mo—5Cr—6Mn | 20 | Fe—65Mo—1Si | 45 and smaller | 3 | 0.85 |
| Example 15 | Fe—30Mo—10Cr—6Mn | 20 | Fe—65Mo—1Si | over 45 to 75 | 3 | 0.85 |
| Comparative Example 9 | Fe—25Mo—10Cr—6Mn | 20 | Fe—65Mo—1Si | over 75 to 100 | 3 | 0.85 |
| Comparative Example 10 | Fe—35Mo—5Cr—6Mn | 20 | Fe—65Mo—1Si | over 100 to 150 | 3 | 0.85 |

| | Sintered body Compositions (mass %) | Wear resistance Axial wear amount (μm) | Machinability Cutter wear amount (μm) |
|---|---|---|---|
| Example 14 | Fe—8.0Mo—1.0Cr—1.2Mn—0.03Si—0.8C | 60 | 71 |
| Example 15 | Fe—8.0Mo—2.0Cr—1.2Mn—0.03Si—0.8C | 64 | 71 |
| Comparative Example 9 | Fe—7.0Mo—2.0Cr—1.2Mn—0.03Si—0.8C | 61 | 77 |
| Comparative Example 10 | Fe—9.0Mo—2.0Cr—1.2Mn—0.03Si—0.8C | 56 | 104 |

(Result 5: The Optimum Particle Diameter of the Second Hard Particle)

As shown in FIG. 9A, the axial wear amounts in Examples 14, 15 and Comparative Examples 9, 10 were in a comparable level. Meanwhile, as shown in FIG. 9B, the cutter wear amounts in Examples 14, 15 were smaller than those in Comparative Examples 9, 10. This is because the particle diameter of the second hard particle was excessively large in Comparative Examples 9, 10 and thus the machinability of each of the test pieces was decreased. From these results, the preferred particle diameter (the maximum particle diameter) of the second hard particle falls within the range of 75 μm and smaller.

The detailed description has been made so far on the embodiment. However, the disclosure is not limited to the embodiment, and various design changes can be made thereto within the scope that does not depart from the spirit of the disclosure described in the claims.

What is claimed is:

1. A manufacturing method of a sintered alloy comprising:
    pressing mixed powder that contains first hard particles, second hard particles, graphite particles, and iron particles into a sintered-alloy compact; and
    sintering the sintered-alloy compact while diffusing carbons in the graphite particles of the sintered-alloy compact into the first hard particles, the second hard particles, and the iron particles, wherein
    the first hard particles contain 10 to 50 mass % of Mo, 3 to 20 mass % of Cr, 2 to 15 mass % of Mn, 1 mass % or less of C, and a remainder including Fe and inevitable impurities when the first hard particles have 100 mass %,
    the second hard particles contain 60 to 70 mass % of Mo, 2 mass % or less of Si, and a remainder including Fe and inevitable impurities when the second hard particles have 100 mass %, and
    the mixed powder contains 5 to 50 mass % of the first hard particles, 1 to 8 mass % of the second hard particles, and 0.5 to 1.0 mass % of the graphite particles when total mass of the first hard particles, the second hard particles, the graphite particles, and the iron particles is set as 100 mass %.

2. The manufacturing method according to claim 1, wherein
    a particle diameter of the second hard particle falls within a range of 75 μm and smaller.

3. The manufacturing method according to claim 1, wherein
    the sintered-alloy compact is heated and sintered at 1050 to 1250° C.

4. The manufacturing method according to claim 1, wherein
    the first hard particles contain 25 to 35 mass % of Mo, 5 to 10 mass % of Cr, 2 to 10 mass % of Mn, and 1 mass % or less of C when the first hard particles have 100 mass %.

5. The manufacturing method according to claim 1, wherein
    the remainder of the first hard particles and the remainder of the second hard particles are Fe and the inevitable impurities.

6. A compact for sintering comprising:
    first hard particles that contain 10 to 50 mass % of Mo, 3 to 20 mass % of Cr, 2 to 15 mass % of Mn, 1 mass % or less of C, and a remainder including Fe and inevitable impurities when the first hard particles have 100 mass %;

second hard particles that contain 60 to 70 mass % of Mo, 2 mass % or less of Si, and a remainder including Fe and inevitable impurities when the second hard particles have 100 mass %;

graphite particles; and iron particles, wherein the first hard particles occupy 5 to 50 mass %, the second hard particles occupy 1 to 8 mass %, and the graphite particles occupy 0.5 to 1.0 mass % when total mass of the first hard particles, the second hard particles, the graphite particles, and the iron particles is set as 100 mass %.

7. The compact for sintering according to claim 6, wherein a particle diameter of the second hard particle falls within a range of 75 μm and smaller.

8. The compact for sintering according to claim 6, wherein the first hard particles contain 25 to 35 mass % of Mo, 5 to 10 mass % of Cr, 2 to 10 mass % of Mn, and 1 mass % or less of C when the first hard particles have 100 mass %.

9. The compact for sintering according to claim 6, wherein the remainder of the first hard particles and the remainder of the second hard particles are Fe and the inevitable impurities.

10. A sintered alloy obtained by sintering a compact comprising:

first hard particles that contain 10 to 50 mass % of Mo, 3 to 20 mass % of Cr, 2 to 15 mass % of Mn, 1 mass % or less of C, and a remainder including Fe and inevitable impurities when the first hard particles have 100 mass %;

second hard particles that contain 60 to 70 mass % of Mo, 2 mass % or less of Si, and a remainder including Fe and inevitable impurities when the second hard particles have 100 mass %;

graphite particles; and iron particles, wherein the first hard particles occupy 5 to 50 mass %, the second hard particles occupy 1 to 8 mass %, and the graphite particles occupy 0.5 to 1.0 mass % when total mass of the first hard particles, the second hard particles, the graphite particles, and the iron particles is set as 100 mass %, and in the sintered alloy, carbon is diffused into the hard particles and the iron particles.

* * * * *